A. Ivers,
Fish Globe,
No. 46,801. Patented Mar. 14, 1865.
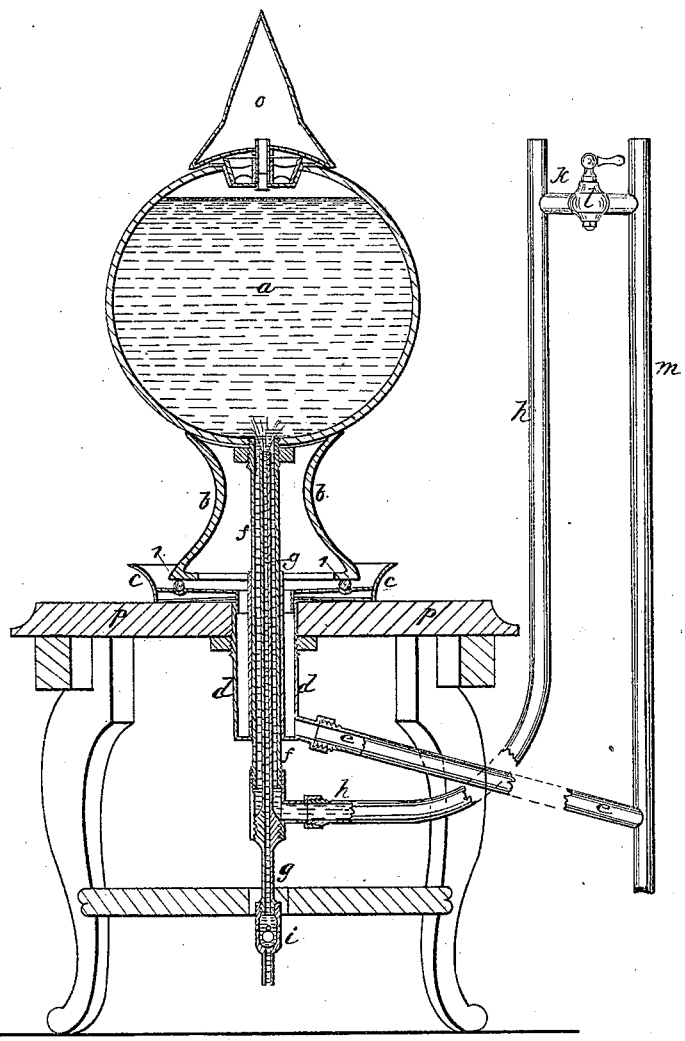
Witnesses:
Lemuel W. Serrell
J. W. Geo. Carol
Inventor:
Alfred Ivers

UNITED STATES PATENT OFFICE.

ALFRED IVERS, OF NEW YORK, N. Y.

IMPROVEMENT IN GLOBES FOR FISHES.

Specification forming part of Letters Patent No. 46,801, dated March 14, 1865.

*To all whom it may concern:*

Be it known that I, ALFRED IVERS, of the city and State of New York, have invented, made, and applied to use a certain new and useful Improvement in Globes or Aquaria for Fishes, &c.; and I do hereby declare the following to be a full, clear, and exact description of the same, reference being had to the annexed drawing, making part of this specification, wherein I have represented a vertical section of my said apparatus.

The object of this invention is to supply water to the receptacle for the fishes, and allow the same to pass away from the bottom after the water rises to a given height, or to cause the water to flow away over the top and outside of the globe or vessel.

In the drawing, $a$ represents a globe or other receptacle for fishes upon a base, $b$, which may be of glass, hollow, containing a colored fluid, or painted inside, or be of any desired ornamental character.

$c$ is a pan in which this base $b$ stands, being supported by small blocks 1 1, of india-rubber, or other material, so as to allow a space between the pan and the bottom of the base. This pan $c$ connects at the middle with a pipe, $d$, from the lower portion of which a pipe, $e$, leads away to a sewer or other discharge for the water.

Up through the pipe $d$ is a pipe, $f$, that connects with the lower parts of the globe $a$, and within this pipe $f$ is the supply water-pipe $g$, that passes up a greater or less distance toward or into the globe. These pipes are fitted with suitable couplings and connections of any convenient character. I have represented the pipe $d$ with an interior sleeve rising above the pan $c$ to pass the pipe $f$.

The lower end of the supply-pipe $g$ is formed with a coupling and a ball-valve at $i$, to prevent the water in the globe running out in case any cock should be opened in the supply-pipe at a lower level than said globe.

From the lower portion of the pipe $f$ is a pipe, $h$, leading off through the floor or in any other convenient manner to a closet or other place where said pipe can conveniently be carried up higher than the level of the globe, as at $k$, and a cock, $l$, is provided to the pipe $m$, that connects with the sewer or discharge-pipe $e$. This cock $l$ is to be at such a level that when it is open the water will pass in through the supply-pipe $g$ and run out through the pipe $f$, thence up the pipe $h$, and escape by the cock $l$ to the pipe $m$, whereby the level of water in the aquaria or globe will be uniform. If this cock is closed the water will rise in said globe until it overflows and runs down the outside into the pan $c$, thence by the pipes $d$ and $e$ to the sewer, so that in either way a supply of fresh water is maintained, and no injury can result from an overflow, and such overflow produces a very pleasing effect.

An ornament may be placed over the globe, as at $o$, and be sustained by a metallic or a glass bridge across the orifice of such globe, and the said ornament $o$ may be of hollow glass painted or filled with colored liquid.

This apparatus may be placed on a table, $p$, or supported in any convenient manner.

What I claim, and desire to secure by Letters Patent, is—

1. The supply-pipe $g$ and escape-pipe $f$, constructed as specified, in combination with the globe or vessel to contain fishes, and with the overflow-pipe $h$, passing away from the pipe $f$ and rising to the height of the water in said globe or vessel, as and for the purposes set forth.

2. The pan $c$ and pipe $d$, fitted as specified, in combination with the globe or vessel to contain fishes, for the purposes and as specified.

3. A globe or other vessel arranged substantially as specified, so that the water may be maintained at a given height or caused to flow over the outside of said vessel, as set forth.

In witness whereof I have hereunto set my signature this 4th day of June, A. D. 1864.

ALFRED IVERS.

Witnesses:
 LEMUEL W. SERRELL,
 THOS. GEO. HAROLD.